May 1, 1945.
R. B. COLT ET AL
2,374,653
RECORDING SYSTEM
Filed May 9, 1940
3 Sheets-Sheet 2
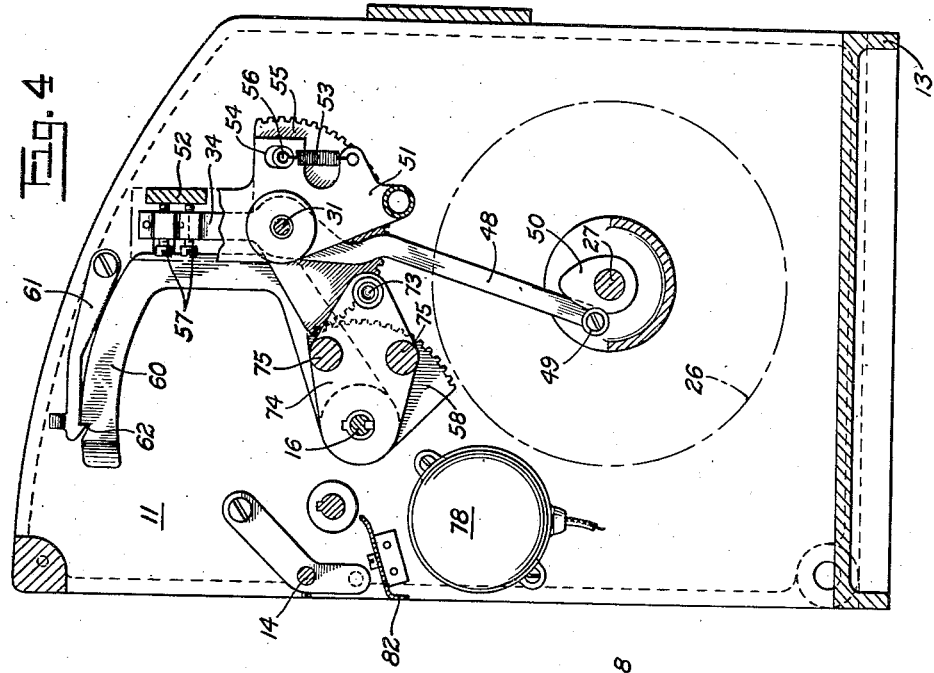
INVENTORS.
Rutger B. Colt
Ralph R. Chappell
BY
David F. Moody
ATTORNEY May 1, 1945.

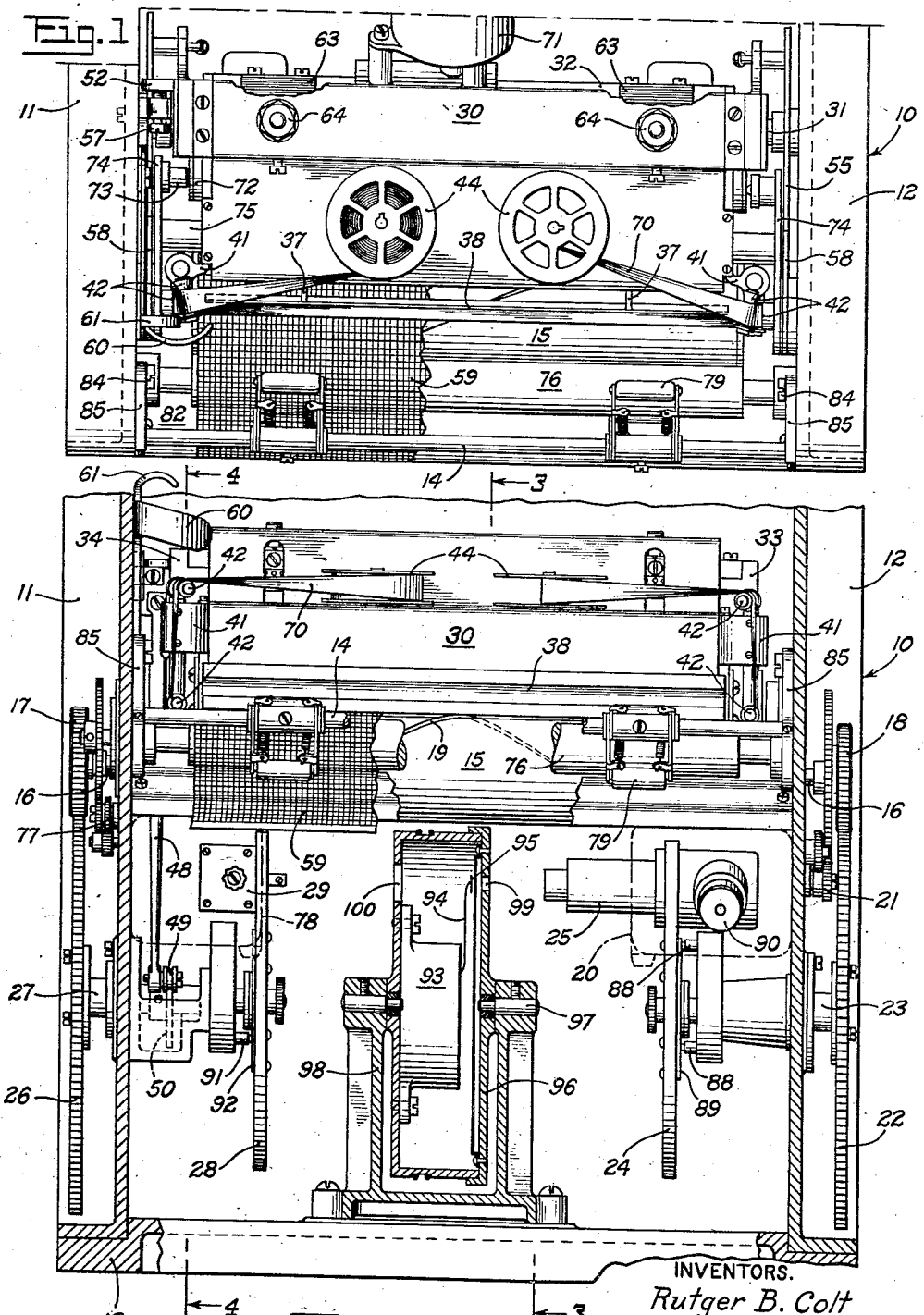

R. B. COLT ET AL 2,374,653

RECORDING SYSTEM

Filed May 9, 1940

INVENTORS.
Rutger B. Colt
Ralph R. Chappell
BY
David P. Doody
ATTORNEY.

Patented May 1, 1945

2,374,653

UNITED STATES PATENT OFFICE 2,374,653

RECORDING SYSTEM

Rutger B. Colt, Baltimore, Md., and Ralph R. Chappell, Richmond, Va., assignors to Bendix Aviation Corporation, South Bend, Ind., a corporation of Delaware Application May 9, 1940, Serial No. 334,286

2 Claims. (Cl. 234—1.5)

This invention relates to recording systems and more particularly to a device for making a written record of radio signals representative of certain atmospheric conditions.

Accurate indications of temperature, humidity, and pressure can be radiated from a balloon ascending to a height of approximately ten miles into the air by means of a small radio transmitter carried thereby, which sends out different signals for the several atmospheric conditions mentioned above. In order to correctly record these signals, various systems have been devised in the past, but have failed to give a satisfactory record capable of accurate evaluation.

One of the objects of the present invention is the provision of a novel device which will accurately and faithfully record radio signals representative of different atmospheric conditions.

Another object of the invention lies in the provision of a novel device adapted to make a written or printed recording of variable conditions in a manner that can be readily interpreted.

Other objects of the invention reside in the provision of a unique photoelectric circuit which, in combination with a novel marking system, gives a precise record of variable events, and in the provision of a compact mechanical arrangement incorporating mechanical and electronic elements in a novel manner to give a clear record of variable conditions which it is desired to measure.

Other objects will appear from a study of the specification and the attached drawings, throughout which like numerals designate like parts.

Certain features of the following disclosure are disclosed and claimed in our application, Serial No. 462,851, filed October 21, 1942, for Recording system (now Patent No. 2,348,711, dated May 16, 1944).

Fig. 1 is a plan view of one embodiment of the present invention;

Fig. 2 is a front elevation with certain parts in section, of the recording device shown in Fig. 1;

Fig. 3 is a cross-sectional view taken along the line 3—3 of Fig. 2;

Fig. 4 is a cross-sectional view taken along the line 4—4 of Fig. 2; and

Figure 5:
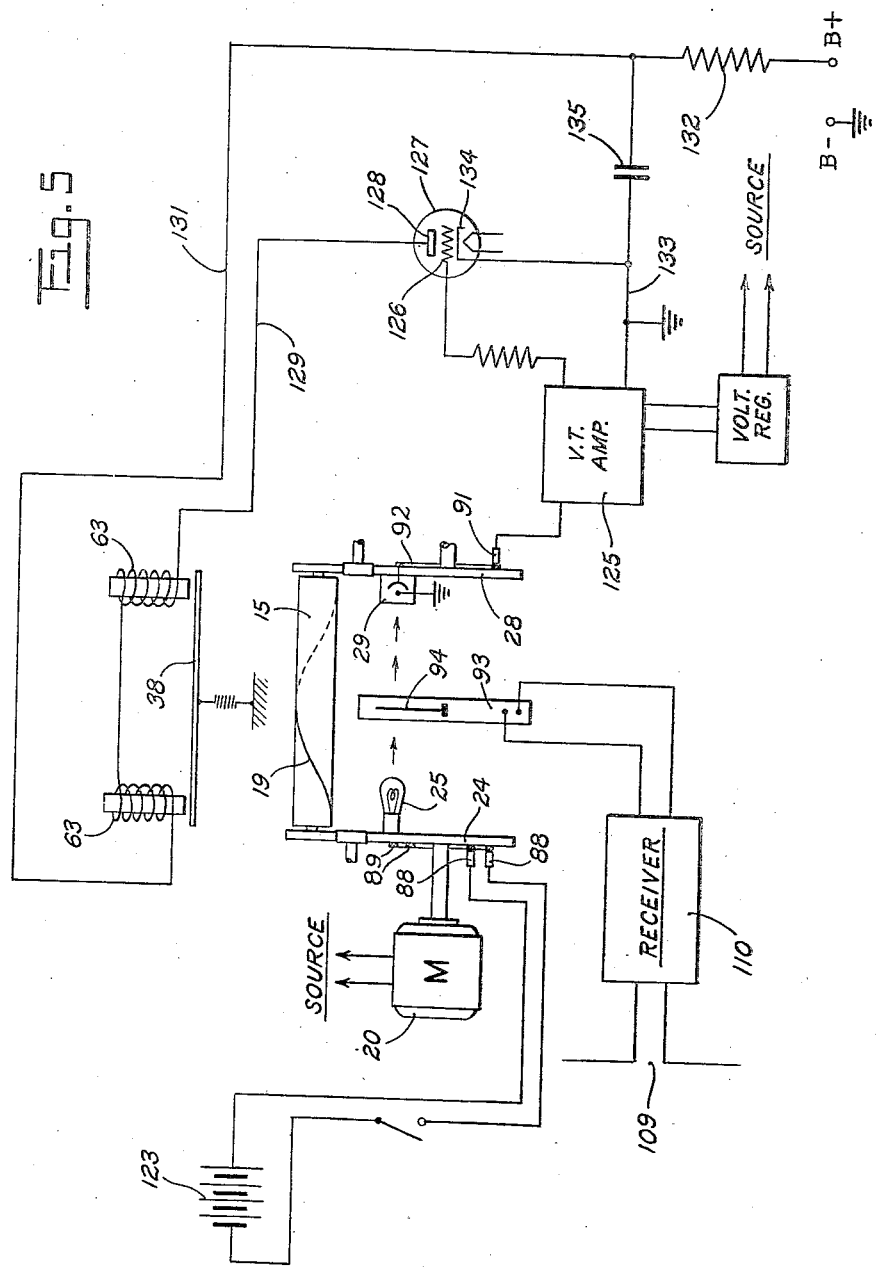
Fig. 5 is a diagrammatic showing of the mechanical and electrical circuits of the embodiment of the invention shown in Figs. 1–4.

The device of the present invention has utility in the general art of recording, but is particularly intended for use on the ground in conjunction with a radio transmitter, which is carried from the ground through the atmosphere by a free balloon and which, as it ascends, will transmit signals characteristic of atmospheric conditions at different elevations. Such a transmitter is usually called a radio meteorograph or a radiosonde and is employed particularly in aviation to determine flight conditions and in general meteorographic service to determine atmospheric conditions at particular stations.

In one form of meteorograph, a carrier frequency of about sixty-five megacycles is modulated by a frequency on the order of one megacycle, which modulating frequency is interrupted at different audio-frequencies representative of different values of temperature, relative humidity, altitude, etc. These signals may be received and recorded by the use of a device made in accordance with the present invention and interpreted by certain rules which it is not necessary to consider at this time.

Having particular reference to Figs. 1 and 2, the recording device 10 is composed of a rigid frame, having metal end-plates 11 and 12, a base member 13, and a transverse supporting rod 14. A printing roll member 15 is mounted between end-plates 11 and 12 and its shaft 16, which passes through holes in end members 11 and 12, terminates in gears 17 and 18, which are keyed to shaft 16. Roll member 15 has a smooth, cylindrical surface upon which is a helical ridge or projection 19 along its length. Printing roll member 15 is driven through a suitable gear train by motor 20, shown in phantom in Fig. 2. A gear 21 is keyed to the shaft of motor 20 and drives gear 18 through a suitable train. The gear 18 meshes with a larger gear 22, which is fixed to shaft 23, to which is also fixed a disc member 24 carrying a light source, designated generally as 25. Gear 17, being affixed to shaft 16 with gear 18, turns therewith and meshes with gear 26, which is fixed to shaft 27 carrying rotatable disc 28 and the photoelectric cell, designated generally at 29.

A carriage, designated as 30, is rockably mounted between end-plates 11 and 12 upon a shaft 31 which is loosely carried by end-plates 11 and 12 in any suitable bearings. As shown more clearly in Figs. 3 and 4, carriage 30 is pivoted to move about shaft 31 and carries transverse frame member 32 which is rigidly connected at its ends to vertical rocker arms 33 and 34, which are mounted to rotate or oscillate about shaft 31 and carry the entire carriage member 30. Fixedly mounted with respect to arms 33 and 34 are horizontally projecting arms 35, to which are attached, by pivotal means 36, additional arms 37 which, at their outer ends, are attached to a transverse tapper bar 38, normally held slightly spaced above the raised portion or projection 19 of roll 15 by means of spring members 39. Vertical end members 40 are rigidly attached to frame member 32 so as to form a part of carriage 30 rockable about shaft 31 and these end members 40 are turned outwardly at their forward end 41 to carry freely rotating spindles 42, upon which a copy ribbon, such as typewriter ribbon, is threaded, as will be later described. Transversely of end members 40, there is placed a rigid bridge member 43 which carries the ribbon rolls 44, and also depending arms 45, which are rigidly attached thereto in any conventional manner, and have horizontally projecting edges forming stop members 46. Horizontally extending stop members 46 contact the underside of arms 35 in order to limit downward rotative motion of arms 35. Spring members 39 are prevented from rotating arms 37 clockwise with respect to arms 35 by means of the stop members 47, which are integrally connected to the ends of arms 37 and extend horizontally inwardly a sufficient distance to bear upon the top surface of arms 35.

It will be seen, therefore (from Fig. 3), that arms 35 and 37 can be rocked clockwise without relative angular motion, but that arms 37 and tapper bar 38 can be rotated counter-clockwise with respect to arm 35 through an arc limited by stop members 47 at one end and projection 19 of printing roll 15 at the other end of its travel.

Rocker arm 34 has an integral extension 48 which terminates in a cam follower 49 in engagement with heart-shaped cam member 50. Cam member 50 is rigidly fixed to shaft 27 and rotated at constant speed by means of gear 26. Also carried on shaft 31, adjacent end-plate 11, is a plate member 51 to which is rigidly connected a transversely extending stop member 52. One end of a spring member 53 is connected to the plate member 51 which has a vertically extending slot 54 therein. Lying in parallel relation to plate member 51, and between it and end member 11, is segmental gear member 55 to which is attached the other end of spring 53 by means of a lug 56 extending through slot 54 of plate 51. Initial adjustment of bar member 38, to be slightly raised above projection 19 of printing roll 15, is accomplished by adjusting screw members 57 with respect to stop member 52 against the tension of spring 53 carried by rocker arm 34. It will be readily seen then, that once every revolution of cam 50, carriage 30, including tapper bar 38, will be rocked clockwise for an interval depending on the characteristics of cam 50, so that an operator may inspect the marking made by tapper bar 38 upon sheet 59, and thus obtain a quick check on the proper operation of the recording device.

A second segmental gear member 58 is pivoted upon shaft 16, extending through end-plate 11 and fixedly connected by means of a key to handle member 60 which lies closely adjacent end-plate 11. Upon pulling handle 60 to the left, as shown in Fig. 4, the whole carriage assembly 30, as well as plate 51, and gear segment 55, will be rocked clockwise, and simultaneously segment 58 will be rocked counter-clockwise, in order to facilitate a change of record sheet 59, and for inspection purposes, as will become apparent as the description proceeds.

In order to prevent rocking motion, due to the engagement of extension 48 with cam 50, from also causing rotation of gear segments 55 and 58, handle 60 is normally held in place by a latch member 61 which engages with the notch or detent 62 in handle member 60.

Frame member 32 carries two electromagnets, indicated generally at 63, which are rigidly suspended by any conventional means, such as nuts and bolts 64. An armature 65, carried by extensions of arms 35, is positioned directly beneath electromagnets 63, and is adapted to be attracted upwardly upon energization of electromagnets 63, as will be later described. In order to maintain armature 65 spaced from the electromagnets 63, when the latter are not energized, carriage member 30 carries arms 66 to which is attached coil spring 67, having its opposite end connected to lever arm 68, which is fixed to armature 65. The tension of spring 67 can be adjusted by the screw and bolt arrangement 69, so that when the electromagnets are de-energized, tapper bar 38 is raised above roll 15, as shown in Fig. 3, and the armature 65 will be positively held spaced from electromagnet 63, and yet will be readily attracted thereto upon energization of the electromagnets, to cause arms 35 and 37, and tapper bar 38, to move downwardly against stop members 46, whereupon the inertia of arms 37 and bar 38 will carry these elements downwardly momentarily against the tension of springs 39, so that tapper bar 38 will strike the projection 19 of roll 15, and thus mark record sheet 59.

Tape rolls 44 are constantly rotated through a suitable gear arrangement, not shown (which also reverses their rotation to change the direction of movement of tape 70), by means of an electric motor 71, carried upon transverse frame member 32. It will be seen that the copy tape 70 extends from one of the tape rolls 44, laterally to spindles 42 on one side of carriage 30, down under tapper bar 38 and longitudinally thereof, up the other side of carriage 30, over spindles 42, and back to the other of tape rolls 44. Record sheet 59, which is marked during the operation of the tapper bar 38, is carried upon a roll 72, rotatable about a shaft 73, which is journalled at both its ends in plate members 74, which are keyed to gear segments 58 so as to rotate shaft 73 and guide members 75 which extend transversely between plates 74, about shaft 16 upon the pulling of handle 60 to the left, as shown in Fig. 4. The record sheet is threaded from roll 72, over the top guide member 75, in between roll member 15 and tapper bar 38, thence to driving roll 76, which is driven at constant speed, through a suitable gear train 77, by motor 78. In order to impart the motion of driving roll 76 to record sheet 59, tension rollers 79, carried upon fingers 80, are resiliently pressed against roll 76 by means of coil springs 81, which normally urge fingers 80 toward each other, to increase the friction between driving roll 76 and record sheet 59.

An apron 82, extending transversely between and carried by end members 11 and 12, guides the sheet 59 to the forward end of the recording device 10, where it may be readily viewed by an operator, or cut off, without interference to the operation of the recording device. The assembly of rollers and fingers 79 and 80 is readily removed from frictional engagement with driving roll 76 for the purpose of changing record sheets, since transverse supporting rod 14, which carries this assembly, is swingable in an arc about pivots 84 by means of arms 85, which carry rod 14 and are pivoted about point 84 on end members 11 and 12. Also, the assembly 79—80 is maintained in frictional engagement with driving roll 76 by means of extensions 86 of arms 85 which carry stud members releasably engageable with detents in end members 11 and 12. Since roll 72 is freely journalled in members 74, means indicated generally at 87, and comprising a plate member carried by the upper guide 75, and a spring for urging this plate against roll 72, introduces sufficient drag upon roll 72 to maintain the surface of record sheet 59 smooth and unwrinkled as it travels beneath tapper bar 38.

In the bottom portions of Figs. 2 and 3 there are shown details of a novel photoelectric system of the present invention. As has already been described, light source 25 is rotated upon disc 24 at a constant speed by means of motor 20 through the gear train shown. Brushes 88, of any conventional type, coact with slip-rings 89 to carry current to the rotating light source from any suitable supply means, such as a battery 123 of Fig. 5. Also, 90 designates a means for focusing light which is projected to the left as viewed in Fig. 2 and intercepted, in the absence of any opaque substance therebetween, by the photoelectric cell 29, which is mounted to be rotated upon disc 28 and driven through gears 26, 17, 18, etc., and through the printing roll 15 by means of motor 20, at a speed synchronous with the rotation of the light source.

Brush 91 cooperates with slip-rings 92 to connect photoelectric cell 29 with an amplifying and impulse generating circuit to be described later. Interposed in the path of light between source 25 and photoelectric cell 29 is a frequency meter 93, having a pointer 94 which is adapted, as will be described later, to vary in accordance with received radio signals. Pointer 94 carries, at its outer extremity, a small flag member 95 which is movable along with pointer 94 in an arc through which light is projected during a portion of a cycle of rotation of light source 25. Meter 93 is carried within an opaque casing 96, which in turn, is rotatably mounted upon shaft 97, supported by pedestal member 98, upon base member 13 to which the pedestal member 98 is securely fixed. Apertures 99 and 100 in casing 96 permit light to traverse the casing, and aperture 99 is tapered at one end, as indicated at 101 of Fig. 3, for a purpose to be described later. Pedestal member 98 has an integral supporting portion 102 which carries a worm gear 103, in suitable bearings 104, as well as a wheel 105 which meshes with worm 103. A dial 106 is rigidly connected to the shaft carrying worm gear 103 for rotating meter casing 96 through a pulley, not shown, rotatable with wheel 105 which transmits rotation to casing 96 by virtue of the endless belt 107. Current for operating meter 93 is introduced thereto by means of terminals 108 which connect with any suitable leads to a radio receiver, as will be described later.

A diagrammatic representation of the recording device is shown in Fig. 5, in which 109 represents a radio antenna of any suitable type, such as a dipole, connected to the input of a radio receiver 110, which is tunable to the carrier frequency of the radiosonde described in the beginning of the specification. This receiver may be of any type, such as a superheterodyne, having an audio-frequency output which is connected to frequency meter 93, having a movable pointer 94. As the radio transmitter sends forth signals at audio-frequencies depending upon the different atmospheric conditions being measured, pointer 94 of meter 93 is movable through an arc of approximately 90 degrees. A motor 20, driven by any suitable source, not shown, rotates a disc 24 which carries a light source, such as lamp 25, and drives, through suitable gearing, heretofore described, a printing roll 15 with its helical projection 19 thereon. The other end of roll 15 drives through suitable gearing, also heretofore described, a disc 28, carrying photoelectric cell 29. Light source 25 may be energized through slip-rings 89, as shown, by an electrical source, such as battery 123. Since the gear trains at each end of printing roll 15 are made to have the same value, it is apparent that discs 24 and 28 will be rotated synchronously, and if lamp 25 and photoelectric cell 29 are initially adjusted to be in the same horizontal plane, then the light from the lamp 25 will be directed to photoelectric cell 29, at every point in the circle through which both are rotated, and the light will be intercepted only at those points at which opaque objects are interposed. Assuming that the only opaque object is the pointer 94, then light will be interrupted at one point in each revolution of discs 28 and 24, which point may vary, depending upon the position of pointer 94. In actual practice, the casing 96 of meter 93 also will interrupt the light, but this has no effect on the operation of the recorder, as will be explained later. The output of photoelectric cell 29 is connected by a suitable slip-ring 92 to the vacuum tube amplifier 125, which may be of any conventional design, capable of amplifying the minute currents of the photoelectric cell. The output of the vacuum tube amplifier is connected to the grid 126 of the gaseous triode 127 which may be of the type commonly known as "thyratron." The anode 128 is connected through a conductor 129 to the coils of electromagnets 63, thence through conductor 131 and resistor 132 to the positive pole of a source of potential which may be the conventional "B" battery. The negative pole of the "B" battery is connected to ground completing a circuit through conductor 133, to the cathode 134 of tube 127. This circuit also includes a condenser 135, which has a function that will be described below.

It is a well known characteristic of thyratrons that the conductance does not change directly with grid potential, but that upon the grid attaining a certain definite positive potential, ionization of the gas causes the anode-cathode conductance through the tube to increase immediately to its maximum value. Once the current flow has been started by the grid, the latter has no further control and removal of grid potential does not affect the anode-cathode current flow. The current flow can be stopped, however, by removing the anode potential for a slight interval, during which the gas de-ionizes. After current flow has been stopped for the de-ionizing interval, full anode potential can be reapplied and the tube remains non-conductive until the grid reassumes its predetermined ignition potential, starting another cycle of operation similar to that just described.

The vacuum tube amplifier 125 is so designed that it impresses an instantaneous positive potential upon grid 126 upon sudden restoration of light after it has been interrupted by pointer 94. At each such impulse of positive potential, the grid 126 causes tube 127 to ionize. Condenser 135, in the normal or undischarged condition of tube 127, is charged to anode potential by means of the source of "B" supply through resistor 132. When the impulse of positive potential is impressed upon grid 126, tube 127 immediately discharges and an impulse of current flows through the anode-cathode circuit, including tapper bar magnets 63, momentarily energizing them and actuating tapper bar 38. At the same time, the discharge of tube 127 causes the condenser 135 to discharge because of the low impedance of the anode-cathode circuit across its plates. The potential is thus removed from anode 128, allowing the tube to de-ionize and be ready for the next impulse of grid current. Upon removal of anode potential, condenser 135 is recharged through resistance 132, which is of such value as to recharge the condenser in a predetermined interval. It will be seen, therefore, that in every cycle of rotation of lamp 25 and photoelectric cell 29, there will be an impulse of potential on grid 126, causing actuation of tapper bar 38 during the momentary discharge of tube 127, and this impulse will occur immediately upon the sudden restoration of the light beam immediately after it has been interrupted by the opaque flag 95 of pointer 94. The record printed upon sheet 59 will be a series of dots, marked laterally upon the sheet, depending upon the time in each cycle of rotation of the photoelectric system that the tapper bar 38 is attracted by electromagnets 63 and caused to strike against helical projection 19.

Since the opaque casing 96, in actual practice, interrupts the beam of light just as does pointer 94, or its flag member 95, it is necessary to prevent operation of the tapper bar upon restoration of the light beam after it has been interrupted by casing 96, and before it has been restored after interruption by pointer 94. Amplifier 125 has been designed so that only sudden (as distinguished from gradual) restoration of the light beam to its full value will cause actuation of the thyratron circuit. Since such design is conventional in the art, it is not discussed here. The gradual restoration of the light beam, after interruption, is not sufficient to impress the necessary positive potential upon grid 126 to ignite the thyratron 127. After the light beam has been interrupted by the opaque portion of casing 96, it is restored as the beam swings through the arc including aperture 99, which is tapered as 101, so that the light beam, as it enters the aperture, is restored very gradually from the point of convergence of the tapered portion 101 to the point at which the aperture has its maximum width, which is greater than the cross-sectional trace of the light beam in the plane of the aperture. It will be seen, therefore, that at only one point will the tapper bar 38 be energized, and this point will be immediately after the light beam has been interrupted by flag member 95 of pointer 94.

By means of the worm and wheel 103, 104, and the dial 106 for actuating the same, meter casing 96 can be rotated through endless belt 107, to move the entire meter assembly, including pointer 94, for calibrating purposes. When the recording device is first installed, the position of pointer 94 for different indications received from the radiosonde mentioned earlier in the specification, may be compared with a calibrated frequency meter and any slight difference between the minimum and maximum frequency values of the meter can be compensated by movement of the meter casing.

As stated above, for every revolution of discs 24 and 28, there will be an actuation of tapper bar 38, corresponding to the point in the cycle of rotation at which pointer 94 is interrupted by the light beam. It has been found that a favorable range of frequencies radiated from the radiosonde and indicative of humidity, temperature, pressure, etc., is about 5 to 80 cycles per second. If frequency meter 93 were capable of indicating throughout 360 degrees, and if it were possible to make aperture 99 extend through 360 degrees of arc, then for every rotation of discs 24 and 28, only one rotation of printing roll 15 would be required, in order that tapper bar 38 might be able to strike projection 19 at any point through its length. As a practical matter, however, meter 93 is restricted to an indicating arc of 90 degrees. If printing roll 15 is revolved only once for every revolution of discs 24 and 28, then the portion of printing roll that could be utilized in the making of a record would be only one-fourth its complete length, since for every 360 degrees of disc rotation there would be only a 90 degree interval in which pointer 94 could cause operation of tapper bar 38. The gear train 77, above described, is, therefore, made of such value that for every rotation of discs 24 and 28, printing roll 15 will make four complete revolutions. Thus, the printed record can be spread completely across the width of printing roll 15. While 90 degrees seems a desirable indicating range for meter 93, it has been found that meters can be used in other ranges of arc, such as 120 degrees. For purposes of description, however, it can be assumed that the meter indicating range is 90 degrees of arc.

While only one embodiment of the invention has been illustrated and described, it will be understood that many changes may be made without exceeding the scope of the present invention. It is, therefore, not intended to limit the invention to the particular embodiment described, but only by the scope of the appended claims.

What is claimed is:

1. Apparatus for recording variable quantities which comprises a meter for measuring such quantities, said meter having a pointer movable through a definite arc and an opaque casing having a transparent portion for the arc through which said pointer is movable, a light source, a printing roll and a photoelectric cell, all being rotated in definitely related cycles, said pointer being disposed so as to intercept a beam of light from said light source to said photoelectric cell once every cycle of rotation, a tapper and marking mechanism disposed adjacent said printing roll, means for mounting a record sheet between said printing roll and said tapper and marking mechanism, and an electronic circuit connected to said photoelectric cell and said tapper mechanism for actuating the latter and marking a record in accordance with an indication of said meter.

2. In a recorder, a rotating light source, a synchronously rotating photoelectric cell, a printing roll having a helical ridge, said roll being movable at a fixed speed, a meter having a pointer movable, in response to the varying of conditions to be recorded, in a restricted arc of the same radius and axially spaced from and lying between the circles through which said light source and photoelectric cell are rotated, a taper bar adjacent said roll and movable thereagainst, means for moving a record sheet between said tapper bar and said roll, and means connected to the output of said photoelectric cell for actuating said tapper bar toward said helical ridge upon interruption of light from said source to said photoelectric cell by said movable pointer to form a record of indications of said meter.

RALPH R. CHAPPELL.
RUTGER B. COLT.